UNITED STATES PATENT OFFICE.

SAMUEL PEACOCK, OF PHILADELPHIA, PENNSYLVANIA, ASSIGNOR, BY MESNE ASSIGNMENTS, TO AGRICULTURAL RESEARCH CORPORATION, OF NEW YORK, N. Y., A CORPORATION OF NEW YORK.

PROCESS OF SMELTING ZINC.

1,154,802.  Specification of Letters Patent.  Patented Sept. 28, 1915.

No Drawing.   Application filed April 18, 1914.   Serial No. 832,815.

*To all whom it may concern:*

Be it known that I, SAMUEL PEACOCK, a citizen of the United States, residing at Philadelphia, in the county of Philadelphia and State of Pennsylvania, have invented certain new and useful Improvements in Processes of Smelting Zinc; and I do hereby declare the following to be a full, clear, and exact description of the invention, such as will enable others skilled in the art to which it appertains to make and use the same.

This invention relates to a process of smelting zinc and has for its object to provide a method by which a larger proportion of the zinc smelted will be recovered as molten zinc than is now possible by the present methods.

With these and other objects in view the invention consists in the novel steps constituting my process, as will be more fully hereinafter disclosed and particularly pointed out in the claims.

It is well known that according to the present method of smelting zinc, carbon and zinc oxid are mixed together in such proportions that sufficient carbon is present to convert all of the oxygen in the zinc oxid to carbon monoxid and a large excess of carbon often amounting to say 100% is also used in order to insure the absence of carbon dioxid $CO_2$. The result therefore is that for every equivalent of zinc which is vaporized there is also an equivalent of carbon monoxid liberated as a gas in the furnace chamber. But, as the zinc vapor condenses during the process, the relative concentration of the zinc vapor in the furnace of course decreases. It is an observed fact that at a certain degree of concentration of the zinc vapor, which degree has not yet been actually determined, the zinc vapor no longer condenses in liquid form, but separates out in a solid form and into small granules which are commercially known as blue powder. The exact physical reason for the formation of this blue powder when a certain degree of concentration of the zinc vapor is reached, is not known so far as I am aware. It is however a well known fact that it is commercially impossible to melt this blue powder so that the zinc can be economically cast therefrom into the form in which it is used in commerce, and consequently this blue powder is ordinarily returned to the furnace and resmelted when the zinc is to be sold in the form of ingots.

According to my process instead of employing carbon as heretofore, I employ the silicon carbid. In such case the furnace mixture consists of one equivalent of silicon carbid $SiC$ and three equivalents of zinc oxid $ZnO$.

With a mixture made up as described the smelting reaction will produce one equivalent of silicia $SiO_2$, plus one equivalent of carbon monoxid, plus three equivalents of metallic zinc. As the latter three equivalents of zinc are in the form of a vapor, it is apparent at once that the degree of concentration of the zinc vapor in the furnace gas is three times as great as in the present method of smelting zinc with carbon and therefore a very much larger proportion of the total zinc smelted can be recovered as molten zinc without reducing the concentration to the critical point, than is possible by the present process. Accordingly a very much less proportion of zinc will separate out as blue powder in my process than in the old process, and therefore a much less proportion of blue powder has to be resmelted.

In carrying out my process the ordinary zinc smelting apparatus and procedure are followed except silicon carbid is employed instead of carbon as above stated.

It is obvious that those skilled in the art may vary the details of my process without departing from the spirit thereof and therefore I do not wish to be limited to the above disclosure, except as may be required by the claims.

What I claim is:

1. The process of smelting zinc which consists in mixing a carbid with zinc oxid in the proportions of one equivalent of carbid to a plurality of equivalents of zinc oxid and raising the temperature sufficient to cause a smelting reaction, substantially as described.

2. The process of smelting zinc which consists in mixing silicon carbid with zinc oxid in the proportions of one equivalent of silicon carbid to three equivalents of zinc oxid, and raising the temperature sufficiently to cause a smelting reaction, substantially as described.

In testimony whereof I affix my signature, in presence of two witnesses.

SAMUEL PEACOCK.

Witnesses:
 T. W. WITHERSPOON,
 FRANCES STEBEL.